United States Patent [19]

Baker

[11] Patent Number: 4,878,807

[45] Date of Patent: Nov. 7, 1989

[54] RELATING TO ENERGY CONVERSION APPARATUS

[76] Inventor: Keith G. Baker, 210 Linden Ave., Rutledge, Pa. 10970

[21] Appl. No.: 174,037

[22] Filed: Mar. 28, 1988

[51] Int. Cl.$^4$ ............................................. F03D 5/04
[52] U.S. Cl. ......................................... 416/7; 415/5; 416/175
[58] Field of Search ............... 416/7, 8, 175 A; 415/5, 415/2 A-4 A

[56] References Cited

U.S. PATENT DOCUMENTS

| 763,623 | 6/1904 | Nance | 415/5 X |
|---|---|---|---|
| 1,481,397 | 1/1924 | Tetetleni | 415/5 X |
| 1,744,924 | 1/1930 | Sargent | 416/175 A X |
| 2,562,388 | 7/1951 | Petr | 415/5 X |
| 3,730,643 | 5/1973 | Davidson | 416/8 |
| 4,049,300 | 9/1977 | Schneider | 415/5 X |
| 4,156,580 | 5/1979 | Pohl | 416/175 A X |
| 4,303,834 | 12/1981 | Li | 415/5 X |
| 4,482,290 | 11/1984 | Foreman et al. | 415/2 A |
| 4,494,008 | 1/1985 | Patton | 415/5 X |
| 4,536,125 | 8/1985 | Herman et al. | 415/5 |

FOREIGN PATENT DOCUMENTS

| 462145 | 12/1949 | Canada | 416/8 |
|---|---|---|---|
| 168108 | 3/1906 | Fed. Rep. of Germany | 416/175 A |
| 509497 | 10/1930 | Fed. Rep. of Germany | 416/7 |
| 950438 | 9/1949 | France | 416/7 |
| 2534636 | 4/1984 | France | 416/8 |
| 101241 | 9/1923 | Switzerland | 415/5 |
| 403,607 | 3/1932 | Great Britain | |
| 629,798 | 9/1949 | Great Britain | |
| 1,168,314 | 10/1969 | Great Britain | |
| 2,131,491 | 6/1984 | Great Britain | |

OTHER PUBLICATIONS

WO 87/04496 PCT 6/1987 Labrador

Primary Examiner—Everette A. Powell, Jr.
Attorney, Agent, or Firm—Plante Strauss Vanderburg & Connors

[57] ABSTRACT

Wind energy conversion apparatus comprises vertical endless travelling belt means and a plurality of interspaced hydrodynamic foil members mounted thereon. Passage of fluid, i.e. wind, over the foil members creates lift forces thereon serving to drive the endless belt means about belt circulating parts. The foil members may have a fixed angle of incidence with respect to the belt runs i.e. between the circulating parts at the top and bottom of the endless belt means; or they may be of variable pitch. In one embodiment the belt means comprises two separate endless belts the foils are carried on arms which have pivotal connections with both belts; and a tension spring connects the belts. A belt circulating part, the lower wheel is coupled to a rotary load, an electric generator. Aerodynamic lift on the foils drives the belt and, by the spring connection, the belt and the rotary load. The foil angle of incidence is determined by the lift and the spring reaction.

11 Claims, 11 Drawing Sheets

RELATING TO ENERGY CONVERSION APPARATUS

BACKGROUND TO THE INVENTION

This invention relates to energy conversion apparatus and is primarily concerned with energy conversion apparatus operable by a flow of fluid.

The economic viability of any wind energy conversion project is, in common with any other prime source energy conversion project, determined by the ratio of, on the one hand, the capital costs involved in the construction of the wind energy conversion apparatus plus the costs incurred in its maintenance during the productive life thereof, and on the other the total energy produced by the apparatus during that period.

Conventionally, windmills of a wide range of differing forms are employed in wind energy conversion. One might think, at first, that a large windmill would be more cost effective than two smaller ones sweeping an equivalent area. In practice this turns out to be true only up to a certain point, a point determined by other factors notably wind behaviour.

The rate of energy conversion by a windmill is a function of the area swept out by the blades of the windmill; but the dynamics of the windmill is a function of the blade mass, that is to say the cube of the blade dimensions. So the rotor mass increases disproportionately with size to the energy produced. This translates to disproportionately higher costs to cope with the dynamic loads generated.

It is an object of the present invention to provide wind energy conversion apparatus which may avoid the problems and, hence, the economic limitations of the windmill, as mentioned above, but more generally to provide a novel form of energy conversion apparatus operable by flow of a fluid with respect thereto.

SUMMARIES OF THE INVENTION

According to one aspect of the invention, energy conversion apparatus operable by a flow of fluid comprises endless travelling belt means and a plurality of inter-spaced hydrodynamic foil members mounted on the endless belt means whereby lift forces are generated by passage of fluid over the foil members and are made to drive the endless belt means.

The apparatus may include means controllably varying the angle of incidence of the foil members between a low value obtaining at a low fluid flow velocity and higher values obtaining at higher fluid velocities.

The apparatus may include start-up means to provide an initial movement to the foil members and, hence, of the endless travelling belt means, at low angles of incidence of the foil members i.e. at low fluid velocities. The start-up means may comprise a wind driven rotor coupled to the endless travelling belt means.

According to the invention also energy conversion means comprises:

a rigid frame structure;

first and second endless travelling belt circulating parts supported for rotation about a first axis defined in the said frame structure;

third and fourth endless travelling belt circulating parts supported for rotation about a second axis defined in the said frame structure;

a first endless travelling belt engaging the said first and third said circulating parts;

a second endless travelling belt engaging the said second and fourth said circulating parts;

a multiplicity of arm members distributed at intervals along the said endless belts, being each pivotally connected to the said belts at spaced apart positions along the arm members;

a multiplicity of hydrodynamic surfaces respectively supported by the said arm members;

spring means linking the said endless belts; and a load in the form of a rotary member adapted to be driven by rotation of the said fourth wheel;

the arrangement being such that lift forces acting on the said hydrodynamic surfaces, as a result of passaage of fluid over the said surfaces, causes the said arm members to pivot against the action of the said spring means, under the load of the said rotary member, about their connections with the said belts, thereby to cause the hydrodynamic surfaces to adopt an angle of incidence determined by the velocity of the fluid over the said surfaces and the lift velocity of the hydrodynamic surfaces.

The said spring means may link two belt circulating parts sharing the same axis. The said axis may be shared by the first and second said belt circulating parts.

The apparatus may comprise means operable in response to variation in fluid flow direction to orientate the hydrodynamic surfaces so as to maximise the lift forces developed thereon.

This aspect of the invention may be used to generate electricity, to pump water, or to propel a ship by coupling the endless belt means to a water-screw propeller.

According to another aspect of the invention, energy conversion apparatus operable on fluid comprises endless belt means, a plurality of inter-spaced foil members mounted on the endless belt means such that, when the endless belt means are driven, lift forces are generated by movement of the foil members through the fluid.

Means are preferably provided whereby the pitch of the foil members may be varied.

This alternative aspect of the invention may be used to propel a ship by disposing the foil members in water.

As used herein, the term "endless belt means" includes, ropes, cables, chains and like endless driven or drive means.

The invention also comprises any novel subject matter or combination including novel subject matter herein disclosed.

BRIEF DESCRIPTION OF THE DRAWINGS

Embodiments of the invention will now be described by way of example only with reference to the accompanying drawings, wherein.

DETAILED DESCRIPTION OF THE PREFERRED EMBODIMENTS

Figures 1, 2:
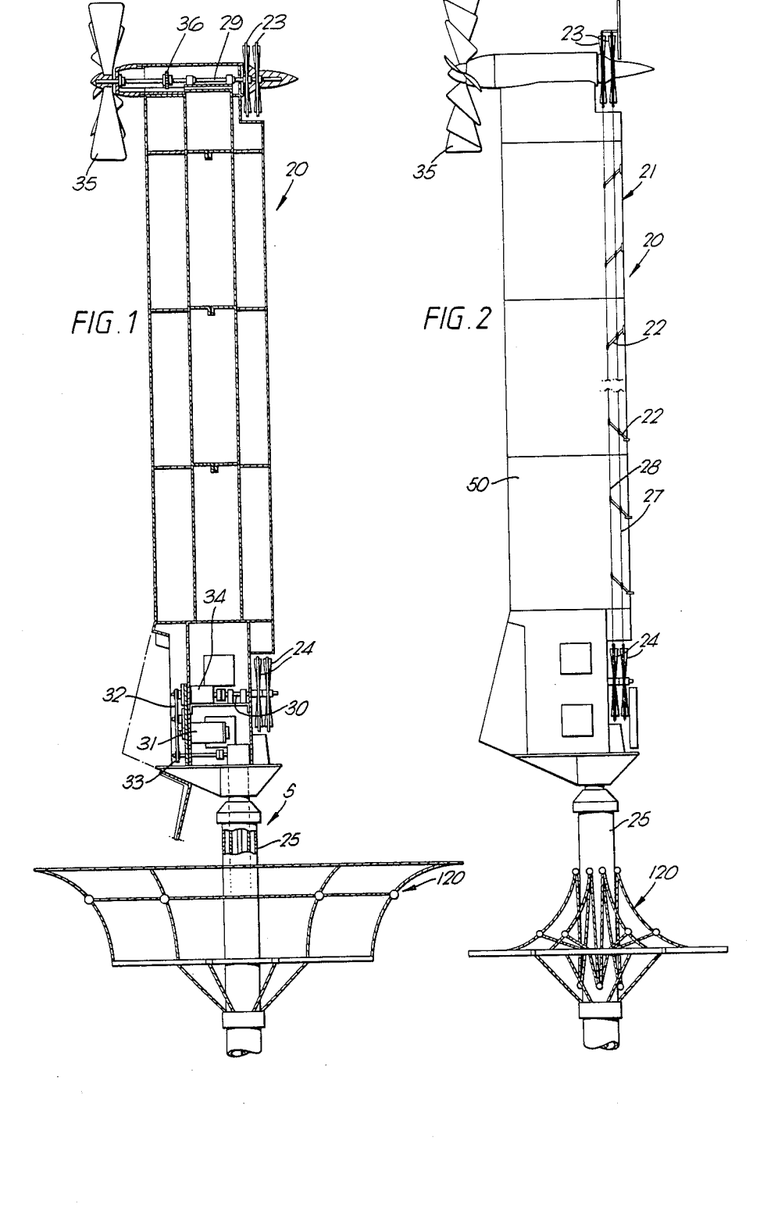
FIG. 1 is a side view, in section, of energy conversion apparatus.
FIGS. 2 and 3 are side and front views of the apparatus.
Figure 3:
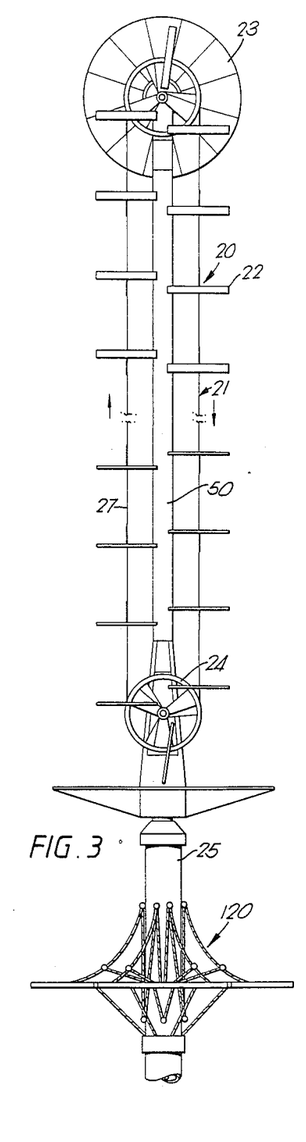

With reference to FIGS. 1 to 3, energy conversion apparatus 20 operable by a flow of fluid (wind) comprises a rigid frame structure S, endless travelling belt means 21 supported by the frame structure S, and a plurality of interspaced aerodynamic surfaces of foil members 22 mounted on the endless belt means 21 so that lift forces are generated by passage of wind over the foil members 22 and are made to drive the endless belt means 21. The foil members 22 are, in lateral cross-section, high speed aerofoils. The bights of the endless belt means 21, which is disposed substantially vertically, extend around belt circulating parts, being upper and lower parts of yoke wheels 23, 24. The frame S of the apparatus 20 incorporates a pillar 25 by which the apparatus is supported above the ground.

The endless belt means 21 comprises two endless cables 27, 28 arranged for movement in respective parallel planes, the cables extending round the upper and lower yoke wheels 23, 24 respectively mounted for rotation on horizontal shafts 29, 30. The shaft 30 is connected to an electric generator 31 by way of a belt (32) and pulley (33) system, as well as a magnetic clutch 34. Tension springs are provided, (see FIGS. 8 and 13), which, acting through the endless belt means 21, serve to keep the foil members 22 thereof in a start-up condition, until the twin opposing forces of lift and reaction, (i.e. the load developed by the generator 31), cause the springs to stretch to the limits imposed by mechanical restraints of the linkage. This is the maximum lift and maximum speed mode of the apparatus 20.

Thereafter when lift or reaction are absent the springs will return the foil members 22 to their original, i.e. startup positions.

Rotation of shaft 30 results in the production of useful electric power from generator 31.

A start-up propeller 35 is provided.

Figure 6:
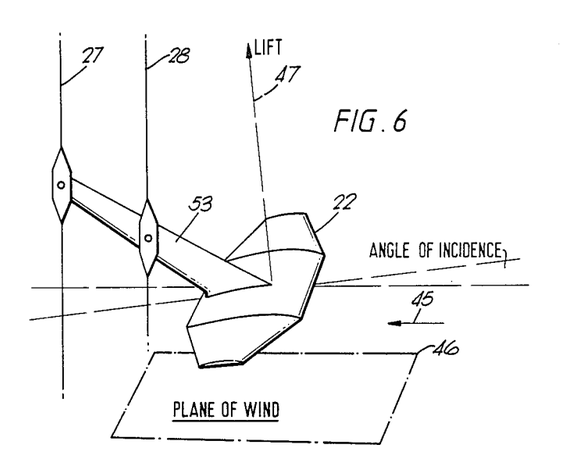
FIGS. 6 and 7 illustrate the principle of operation of the arrangement.
Figure 7:
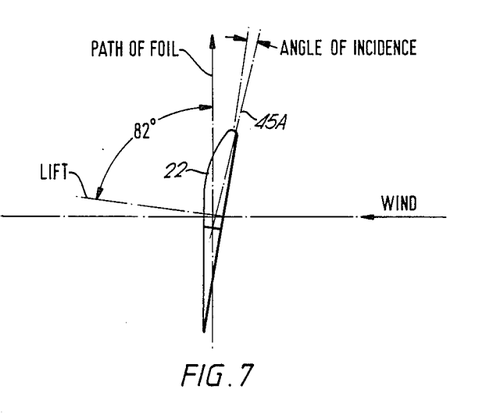

FIGS. 6 and 7 illustrate the principle of lift-force generation by a foil member 22. In FIG. 6, a cantilevered arm 53 is disposed so that the leading edge of the foil member 22 it supports faces into the wind. The wind direction is indicated by arrow 45. The lift force acting on the foil member 22 is indicated by the arrow 47.

A component of the lift force 47 will act along the cable 28, and, as the belt means 21 begins to move along its path, the apparent wind direction changes and increases in velocity. In response to these changes, the foil member 22 has to tilt toward the new apparent wind direction (45a - see FIG. 7), and to the desired angle of incidence to it. Lift increases in proportion to the square of the velocity and continues to cause the cables 27, 28 to travel faster, reaching an optimum power condition when the lift force approaches an angle of approximately 82° to the cable, as shown in FIG. 7. Beyond this point the now very large lift force would begin to lose effectiveness as its direction approaches one which is normal to its most desired direction, having zero effect at 85° or 86° and rapidly increasing negative influence from thereon. In comparison, the conventional windmill blade sees a changing speed along its length which reaches the maximum efficiency element but goes right on past it to the zero effect point mentioned above. The foil members 22 however, can be at or near this maximum efficiency setting over their entire lengths, giving an advantage over the windmill blade on an area-to-area basis of up to 6:1, in the case of a high speed aerofoil. R.A.F. No. 15 is an example of such an aerofoil.

The apparatus 20 includes an upright, elongate rigid structure 50 (FIG. 2) which also serves as a directional stabilizer structure. The structure 50 is in the form of a sheet metal, aerodynamic mast which is acted on by the wind so as to rotate the structure 50 and foil members 22 so that the foil members face into the wind as the wind direction changes.

Figures 8, 9:
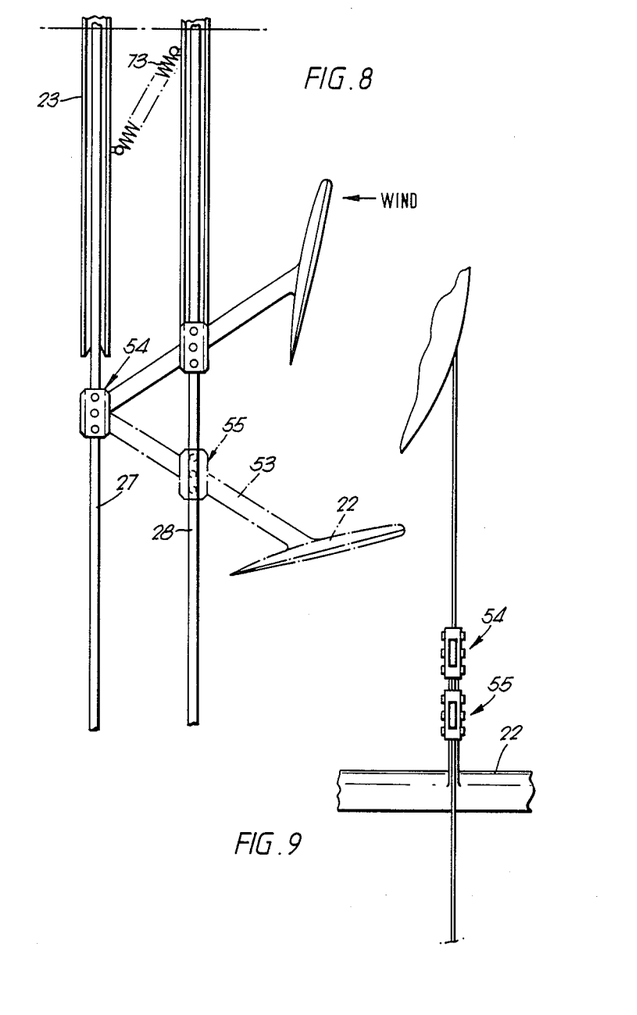
FIGS. 8 and 9 illustrate how pitch of a foil member is varied.

As is seen in FIG. 8, each foil member 22 is pivotally connected to cable 27 at one end of a cantilever arm 53 by pivot structure 54, and is pivotally connected intermediate the ends of arm 53 to cable 28 by pivot structure 55. The arm 53 is connected to the foil member 22 generally mid-way along the foil member and mid-way across the foil member. Movement of cable 27 relative to cable 28 will move the arm 53 so that the foil member 22 can move from a start, low-lift, position shown in chain-dotted lines, to a full-lift position shown in continuous lines. The tension springs described above bias the foil members to their start-up positions until lift forces generated by the wind flowing overcomes the spring force and can move the arm 53 until it meets a stop. All the arms 53 are moved together when cable 27 moves relative to cable 28.

Figure 10:
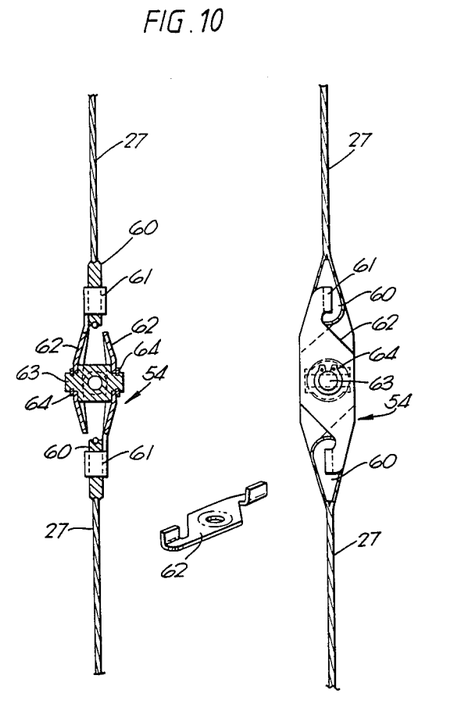
FIGS. 10 and 11 illustrate details of the endless cable means.
Figure 11:
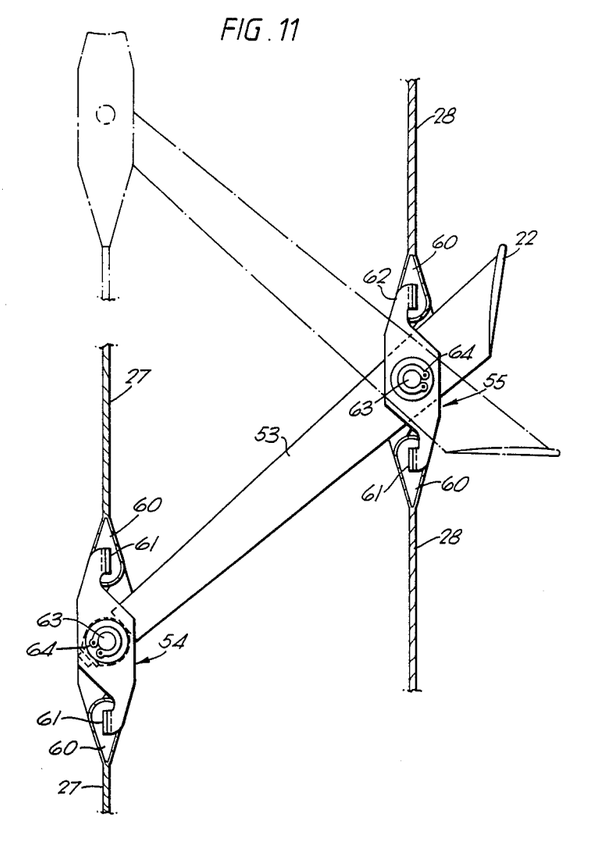

FIGS. 10 and 11 illustrate another form of pivot structure 54 or 55. Stainless steel or "KEVLAR" (Registered Trade Mark) cable 27 has ends received on slotted eyelets 60 through which extend lugs 61 formed on connecting spaced plates 62 (stainless steel or titanium) which clamp between them a trunnion 63. The trunnion 63, in respect of the forward cable 28, is part of the arm 53, and, in respect of the aft cable 27, provides a pivot for the end of the arm 53. Snap rings (or "CIRCLIPS") 64 secure the end of arm 53 and both trunnions 63. Rotation of the arm 53 in a trunnion 63 takes place whenever either of the couplings 54 or 55 precedes the other, either on to, or off of, the associated yoke wheel.

With cables 27, 28 in sections connected by the couplings 54, 55 assembly and replacement of parts is relatively easy and the size of the unit can be changed by adding or removing sections. Spacing of the foil members 22 is fixed.

Because the foil members 22 are spaced forward of the cables on arms 53, drag and turbulence in the region of the foil members is reduced.

The bias springs return the foil members 22 to their start-up or datum positions when the wind speed is too low to generate useful power.

The pitch of the foil members 22 is variable for two reasons:

1. Windmill/wind belt blades/foils are designed to operate at a certain speed relationship to the wind speed. When that relationship is in the order of 9 to 1, the blade tip/foil chord (pitch) angle is close to being at right angles to the wind (85°).

After stopping due to lost wind, such an arrangement will not start up again for a light wind because the foil members will not develop enough lift whilst almost flat on to the wind. The foil members must be partially feathered to start up or power must be applied through the generator 31 to get it moving.

2. Excessive winds will destroy the machine, so a means must be employed to limit the speed at which it may run. One way to accomplish this is to reduce the pitch angle so that the foil members now run at a lower speed relationship to the wind. In the case of the present invention, the pitch angle of a foil member can be reduced to zero, causing it to stop completely, if desired.

Three methods can, for example, provide the desired control. Feathering for start-up is achieved by resisting the lift leverage forces of a cantilever 53 with a spring. When there is little or no lift, the spring will return the foil member to a "start-up" position. When the wind picks up and lift forces cause the endless belt means 21 to start moving, increasing speed and lift will continue to stretch the springs until the foil members 22 reach their maximum setting, when stop means arrest movement.

The pitch change system will maintain the foil members 22 at that setting, where they will run at a substantially constant ratio to the wind speed up to a certain maximum speed, as determined by the forces to be dealt with. At that point, a governor will commence to reduce the differential between the yoke wheel pairs 23, 24, thereby reducing the foil chord angle and the relative speed ratio to the wind.

Lift-generating attitudes are assumed during both forward and reverse runs of the endless belt means 21.

The yoke wheels 23, 24 are designed so as to accommodate relative vertical movement between the endless cables 27, 28.

Figures 12, 13:
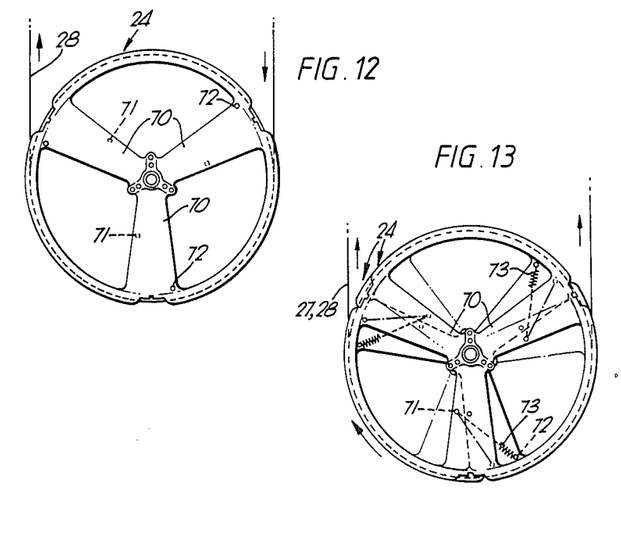
FIGS. 12 to 16 illustrate details of the yoke wheels and pitch control mechanism used by the apparatus, and FIGS. 17 to 20 collectively illustrate an alternative construction of the endless belt and associated circulating parts.

With reference first to FIG. 12, a wheel 24 is of spoked form, each of the spokes 70 thereof carries a pair of spaced-apart studs 71, 72 to which the ends of tension springs 73 (FIG. 13) are anchored. Each stud 71 is disposed on the far side of the wheel 24, whereas each stud 72 is disposed on the near side thereof.

Referring now to FIG. 13, each pair of yoke wheels 24 (and similarly wheels 23) are coupled by the tension springs 73 which are disposed between the wheels. The springs 73 bias the wheels to positions whereby their spokes 70 are non-aligned as shown in phantom, i.e. zero pitch position of the foil members 22.

The front or drive wheel 24 is fixed to the shaft 30 and therefore will resist rotation through the magnetic particle clutch 34 and generator 31. This resistance enables foils 22 to enact a leverage through cantilevers 53 as shown in FIG. 8, and in accordance with the force of lift being applied, will stretch the springs 73, permitting the drive (front) wheel to move ahead of the rear wheel, thereby changing the foil pitch.

Figure 14:
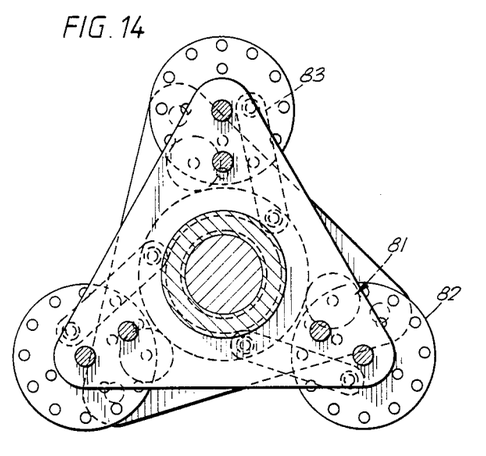
Figure 15:
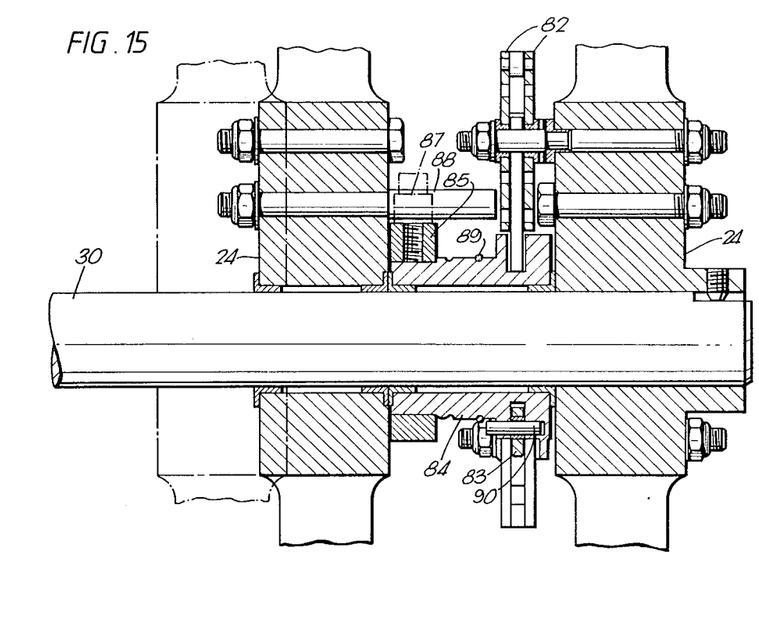
Figure 16:
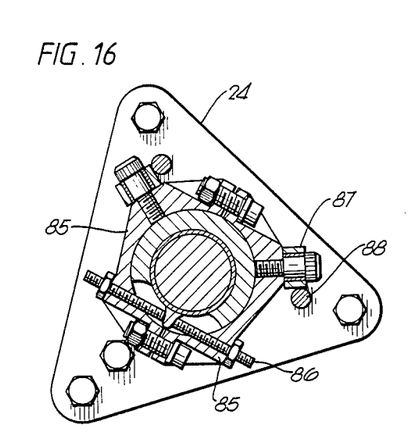

FIGS. 14, 15 and 16 illustrate how (FIGS. 14, 15) the wheels of a yoke wheel pair 24 (or 23) can move relative to each other both axially and angularly on their common support shaft 30 and how (FIG. 16) original settings of the wheels can be made.

With reference first to FIGS. 14 and 15, this apparatus acts to reverse the previously described pitch change when the wind speed exceeds a certain predetermined speed. Weights 81 are attached to force transposer wheels 82 which are mounted to the front yoke wheel 24. 'G' forces on the weights 81 tend to rotate the force transposer wheels which, through links 83, in turn tend to rotate the sleeve 84 and the clamp ring 85 clamped to it in an adjustable manner through ring adjuster 86.

Referring now to FIG. 16, rollers 87 on the clamp ring 85 push against pins 88 extending from the rear yoke wheel 24, which is free to rotate and slide on the shaft 30 as the pitch of the foils 22 is reduced as wind speed increases further.

Referring to FIG. 15, a spring ring 89 serves to retain the inner link pins 90 whilst set into a groove in sleeve 84. A second groove set back from the first, allows pins to be extracted to link 83 release position but retains the pins in place.

As shown in FIGS. 1 to 3, a maintenance/safety platform 120 is secured below the upper end of the pillar 25. The platform 120 can be folded (as in FIGS. 2 and 3).

On start-up of the apparatus 1, the propeller 35 is turned by the wind. A centrifugal clutch 36 (FIG. 1) is used to couple the propeller 35 with endless belt means 21 as soon as propeller speed allows. The clutch 36 can then be disconnected.

As the endless belt means 21 moves the foil members 22 take up "full-pitch" positions, against their tension spring loads. Angular movement between the wheels of wheel pairs 23, 24 then takes place, which movement is accommodated as explained above.

Figure 4:
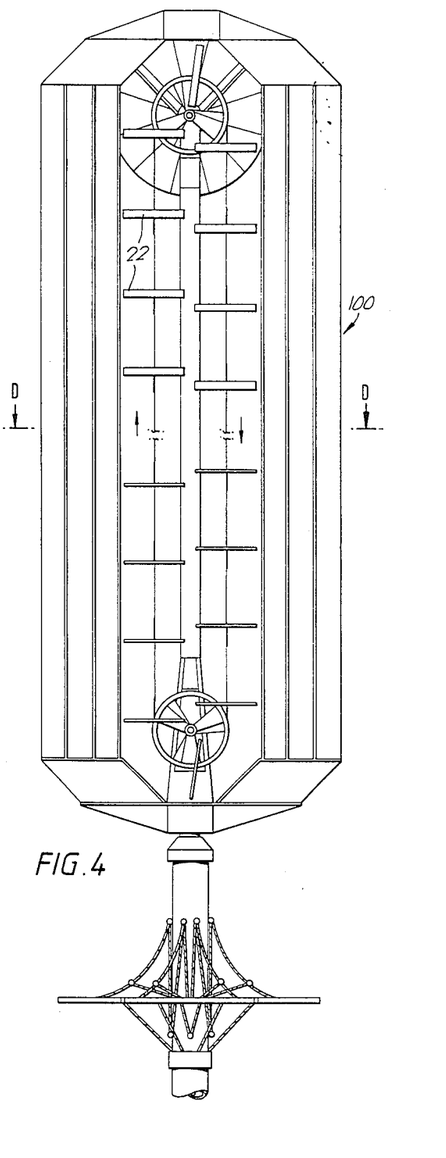
FIG. 4 is a front view of a modified form of apparatus.
Figure 5:
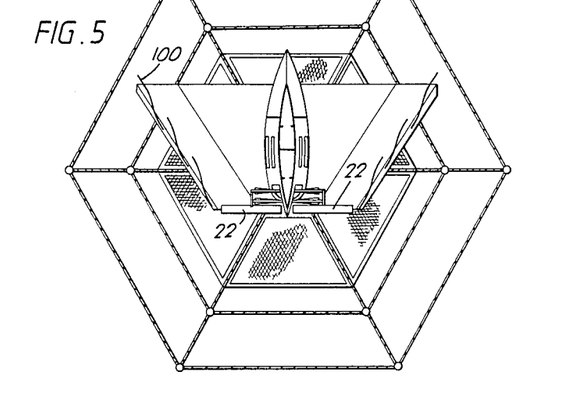
FIG. 5 is a section, taken on the lines D—D of FIG. 4.

FIGS. 4 and 5 illustrate a modification provided with wind force booster means 100, comprising a funnel-like structure, (when viewed in plan), which causes the wind to increase speed over the foil members 22.

Referring, next, to FIGS. 17 to 20, in an alternative construction of the energy conversion apparatus, an endless travelling belt comprises a strong plastic belt 101 of e.g. KEVLAR (Registered Trade Mark). The belt 101 has a multiplicity of thrust receiving portions 103 distributed at intervals therealong. Each thrust receiving portion 103 comprises two closely spaced transverse rib portions, 107a, 107b, respectively, integral with the main body 105 of the belt 101.

The belt 101 may support fixed pitch aerodynamic foils as 109; or it may support variable pitch foils as 111.

Fixed pitch foils, as 109, are bonded to side surfaces, as 113, of the belt 101 at right angles to the plane of the belt. Variable pitch foils, as 111, are angularly displaceable about resiliently flexible couplings constituting hinges the axes of which are defined in the belt 101 at right angles to the plane of the belt.

Figure 17:
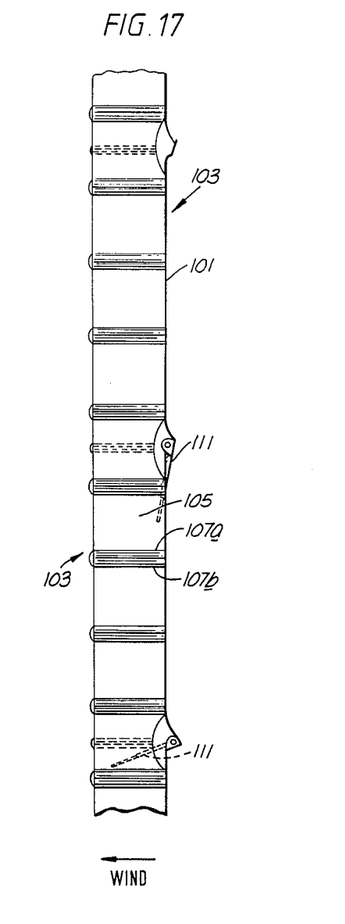
Figure 18:
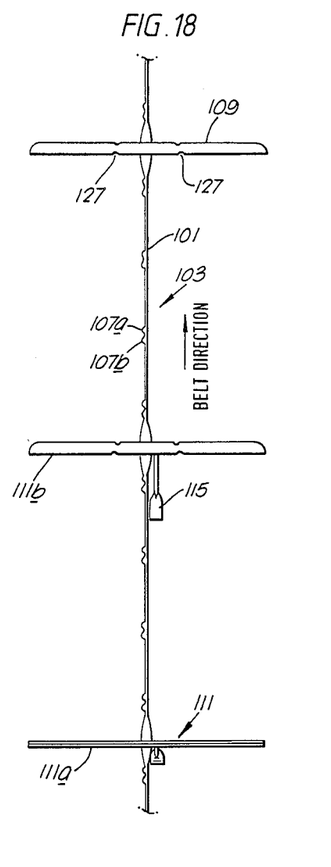

In the arrangement of FIGS. 17 to 20 variable pitch foils 111 each carry a control vane 115 operable to vary the incidence of the associated foil 111, in dependence upon wind velocity. In FIGS. 17 and 18 the foil 111a is shown in the start-up position, and the foil 111b at maximum speed pitch.

Figure 19:
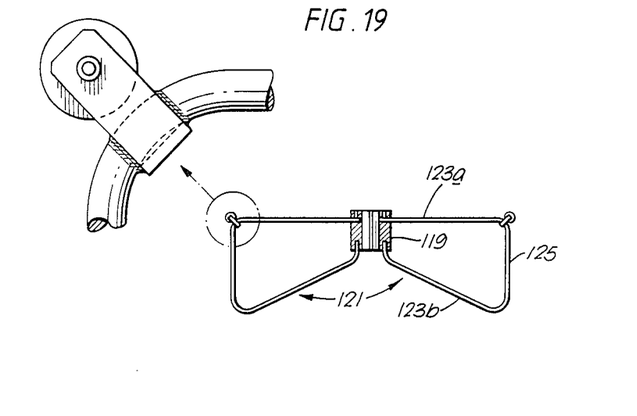
Figure 20:
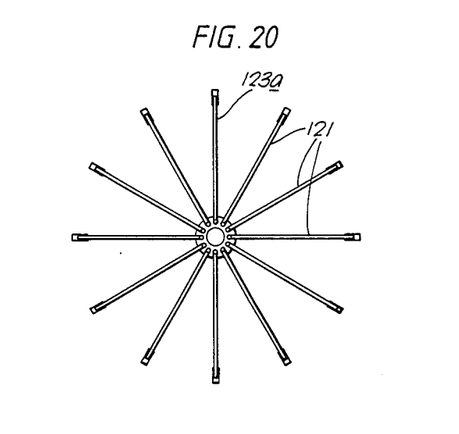

FIGS. 19 and 20 contain a representation of the belt the circulating parts employed in connection with the belt of FIGS. 17 and 18. Here the circulating parts each comprise a spider shaped wheel 117. There is a hub portion 119 from which radiate the several legs 121 of the wheel. Each leg 121 has first and second portions 123a, 123b, secured to the hub portion 119 and each having a radial component of direction; and a longitudinally extending portion 125, integral with the outer extremities of the radial portions 123a, 123b, of a length equal substantially to the length of the thrust receiving portions 103 of the belt 101. The chordal distance between the portions 125 is equal to the spacings between the thrust receiving portions 103 of the belt 101.

In operation, the spider wheels 117 are driven by progressive engagement of the portions 125 between the transverse rib portions 107a, 107b.

The foils, as 109, may be curved in cross-section and may have weakened portions 127 permitting the foils to snap fold in damaging winds.

Some of the advantages of the present invention, compared with the conventional windmill, are as follows:

(a) An electrical generator can be disposed at the bottom of the apparatus instead of having to be at the top, reducing structural loading and simplifying maintenance.

(b) Area for area, a foil member 22 is several times as efficient as a windmill blade.

(c) Being able to reduce the total foil surface to about one sixth of that required for a conventional windmill blade sweeping an equivalent area, reduces the total foil member volume and mass to about a fourteenth. This mass is furthermore broken down into a greater number of foil components so that the sort of dynamic loading associated with a conventional windmill simply will not apply. Additional mass reduction will result from being able to fabricate the much lower stressed foil members with their non-catastrophic failure character, out of the lighter materials.

(d) Foil member pitch control allows the invention to operate in much higher wind speeds than can a conventional windmill.

(e) Because of the much simpler aspect of straight rather than circular deflectors, the invention is particularly suited to wind enhancement techniques. By channelling the adjacent wind outward behind the foil members, (using structure 100), a low-pressure area is created in the centre which speeds up the airflow over the foil members. In its most efficient arrangement, the means 100 could be expected to increase power in the same ratio that intersected area is increased.

Thus an increase in power can be obtained without additional dynamic components. Also, because all wind speeds are increased, the minimum effective wind speed instead of being about seven m.p.h., might now be lowered to perhaps 5 m.p.h. enhanced to 7 m.p.h.

(f) Deploying the invention in a "wind farm" situation would make better utilisation of the available acreage because its vertical disposition would allow it to intersect a greater cross-section of the wind, given the same spacing and the same width of sweep as blade diameter for the conventional windmill. The actual extent of the improvement would be determined by the maximum height to width ratio to which the invention can be economically built.

(g) The invention is expected to be more responsive to wind direction changes without inducing high stresses due to blade precession.

(h) The apparatus 1 could throw (i.e. lose) a foil member 22 with no more effect than reduced power.

(i) Pitch control is automatic partly through the spring versus lift force arrangement.

(j) Expansion of an apparatus 1 is possible up to some maximum height as determined by future tests.

(k) Start-up is automatic partly through the multi-bladed, coarse pitch, start up rotor.

(l) The maintenance/safety platform 120 together with the lighter nature of components in general will ease construction and maintenance.

The invention is not confined to the conversion of wind energy, or indeed air as a driving fluid. In a modified form, it may be driven for example, by river water flow or by tidal streams.

It may also be "reversed" by driving the endless belt means whereby the apparatus may be used for propulsion.

Basically the belt loop requires a minimum of two circulating points one of which is a drive. The drive unit can be on or near the ground and the passive unit supported above it from the side of a building for instance. The units can be made to swivel, or not, depending on the local wind direction constancy. But either way the basic simplicity and convenience of such units would make them cheaper than a conventional windmill to the extent they would be worth placing in less than optimum settings. Buildings, bridges, water towers, radio masts, lamp standards, power pylons, cooling towers and other tall structures can be utilized.

Because the windbelt is so passive it would be much more acceptable for use on the windy tops and corners of city buildings for not only have vibrations been minimized but personal danger from a separated windbelt foil is miniscule to that from a separated windmill blade. New highrise buildings can be designed to incorporate large areas of windbelts, giving them a distinct economic advantage as well as an architectural enhancement.

One obvious market for the windbelt is wind farms. This is because the vertical form of windbelts enables them to intersect more vertical area from the available land acreage than do conventional windmills, thereby increasing power per acre. Here the conventional windmill tower would most likely be replaced with a more cost effective means of deployment such as a trestle in which a number of windbelts are strung side by side beneath a continuous beam. The windbelts can also be tilted to be normal to the local wind which on a mountain is rarely horizontal.

I claim:

1. Energy conversion apparatus which comprises:
   a rigid structural frame;
   endless belt circulating means supported by the said structural frame;
   endless belt means mounted on said endless belt circulating means for movement thereon;
   a multiplicity of generally planar hydrodynamic lift members spaced apart at intervals along, and mounted on and laterally offset from the said endless belt means for pivotal movement of said lift members about an axis outside of and parallel to the plane of said lift members; and
   load means having a rotary part coupled to the said endless belt means, the arrangement of the several parts being such that lift forces are developed acting on the said lift members as a result of passage of fluid thereacross, such lift forces being transmitted to the said belt means so as to cause motion thereof about the said circulating parts.

2. Energy conversion apparatus as claimed in claim 1 in which the lift members are curved in cross-section and have weakened portions of reduced cross-section permitting the lift members to snap-fold under excessively high velocities.

3. Energy conversion apparatus as claimed in claim 1 in which the said attachment means comprise arms so coupled to the said belt means as to permit variation in the angle of incidence of said lift members supported by said arms in response to variation in fluid flow across said lift members.

4. Energy conversion apparatus as claimed in claim 1 in which:
   the said endless belt circulating means comprises: first and second endless belt circulating parts supported for rotation about a first axis defined in the said structural frame; and third and fourth endless belt circulating parts supported for rotation about a second axis, parallel to the said first axis, defined in the structural frame;

the said endless belt means comprises: a first endless belt engaging the said first and third belt circulating parts thereby forming a first endless belt subassembly, and a second endless left engaging the said second and fourth belt circulating parts thereby forming a second endless belt subassembly;

a multiplicity of arm members with each of the said multiplicity of lift members distally secured to a respective one of said arm members and distributed at intervals along the said first and second endless belts, each arm member being pivotally connected to the said first and second belts at spaced apart positions along the said arm member;

spring means resiliently coupling the said first and second endless belt subassemblies;

and the rotary part of the said load means is coupled to one of the said endless belt subassemblies; and the arrangement of the several parts is such that lift forces acting, as aforementioned, on the said lift members causes displacement of the other of the said endless belts relative to the said one belt, the arm members pivoting to permit this and thereby varying the angle of incidence of the lift members accordingly, the extent of such pivotal displacement being determined under a given fluid flow across the lift members by variations in extension of the spring means against the reaction of the load means which is being driven by the said one belt.

5. Energy conversion apparatus as claimed in claim 4 in which the said spring means comprises a spring coupling two belts circulating parts sharing the same axis of rotation.

6. Energy conversion apparatus as claimed in claim 1 in which the said endless belt circulating means comprises first and second belt circulating parts supported for rotation about an axis defined in the said structural frame; the said endless belt means comprises an endless belt engaging the said belt circulating parts; the rotary part of the said load means is coupled to the said endless belt; each of the said multiplicity of hydrodynamic lift members are pivotally connected to said endless belt transverse to the plane thereof by a respective one of a mulitplicity of resiliently flexible couplings spaced apart at intervals along an edge of the said belt; and the arrangement of the several parts is such that lift forces acting, as aforementioned, on the said lift members causes the said lift members respectively to pivot against the bias of the said resiliently flexible connections, the extent of such pivotal displacement being determined by the resultant of the velocity of the fluid and the lift velocity of the said lift members.

7. Energy conversion apparatus as claimed in claim 6 in which the belt circulating parts each comprise a spider element the radially extending arms of which are cranked to provide portions extending parallel to the axis of symmetry of the spider element; and the endless belt has transversely extending portions spaced apart by a distance equal to the distance between the said cranked portions so that the said transversely extending belt portions and the crank portions of the spider arms are brought to engagement during motion of the belt around the belt circulating parts.

8. Energy conversion apparatus as claimed in claim 7 in which a multiplicity of control vanes respectively associated with the said lift members are operable in response to fluid incident thereon to vary the incidence of the lift member in dependence upon the fluid velocity.

9. Energy conversion apparatus as claimed in claim 1 and which has start-up means operable to initiate movement in the endless belt means at low fluid velocities.

10. Energy conversion apparatus as claimed in claim 9 in which the said start-up means comprises a wind driven rotor coupled to the said endless belt.

11. Energy conversion apparatus as claimed in claim 3 in which:

the said endless belt circulating means comprises: first and second endless belt circulating parts supported for rotation about a first axis defined in the said structural frame; and third and fourth endless belt circulating parts supported for rotation about a second axis, parallel to the said first axis, defined in the structural frame;

the said endless belt means comprises: a first endless belt engaging the said first and third belt circulating parts thereby forming a first endless belt subassembly, and a second endless belt engaging the said second and fourth belt circulating parts thereby forming a second endless belt subassembly;

a multiplicity of said arms with each of the said multiplicity of lift members distally secured to a respective one of said arms and distributed at intervals along the said first and second endless belts, each arm being pivotally connected to the said first and second belts at spaced apart positions along the said arm;

spring means resiliently coupling the said first and second endless belt subassemblies;

and the rotary part of the said load means is coupled to one of the said endless belt subassemblies; and the arrangement of the several parts is such that lift forces acting, as aforementioned, on the said lift members causes displacement of the other of the said endless belts relative to the said one belt, the arms pivoting to permit this and thereby varying the angle of incidence of the lift members accordingly, the extent of such pivotal displacement being determined under a given fluid flow across the lift members by variations in extension of the spring means against the reaction of the load means which is being driven by the said one belt.

* * * * *

UNITED STATES PATENT AND TRADEMARK OFFICE
CERTIFICATE OF CORRECTION

PATENT NO. : 4,878,807
DATED : November 7, 1989
INVENTOR(S) : Keith G. Baker

It is certified that error appears in the above—identified patent and that said Letters Patent is hereby corrected as shown below:

Claim 1, line 44, after "means" insert --by attachment means secured to said endless belt means --

Claim 2, line 58, after "high" insert --fluid--

Signed and Sealed this

Thirteenth Day of November, 1990

*Attest:*

HARRY F. MANBECK, JR.

*Attesting Officer*      *Commissioner of Patents and Trademarks*